O. S. GOOCH.
WORK BENCH STOP.
APPLICATION FILED JULY 29, 1910.
982,716.
Patented Jan. 24, 1911.
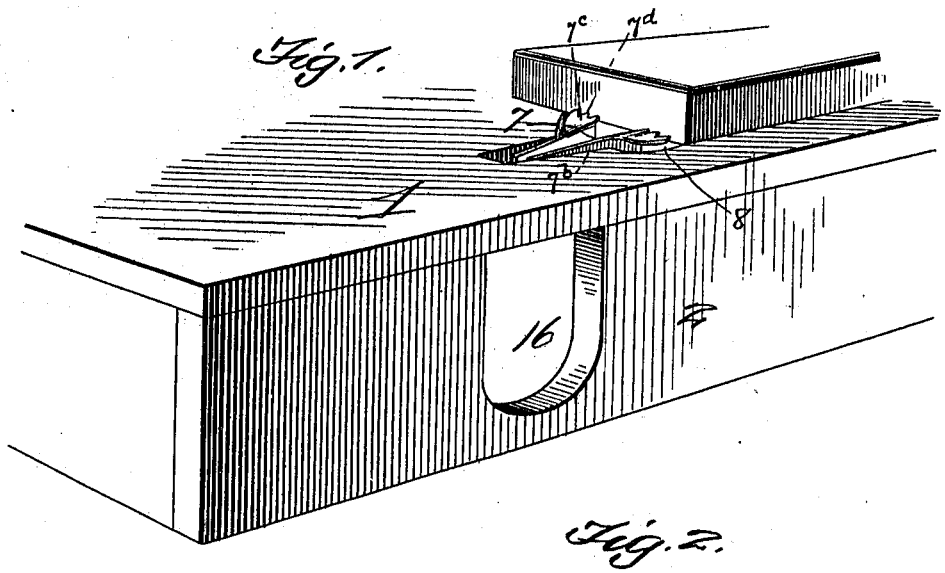
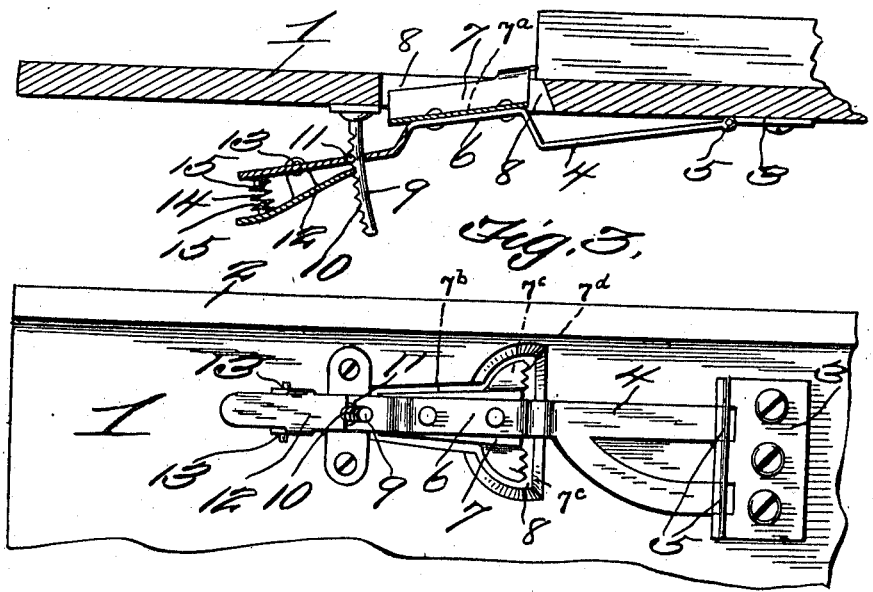
Witnesses
Inventor
O. S. Gooch,
by D. Swift &Co.
Attorneys

UNITED STATES PATENT OFFICE.

OSWALD S. GOOCH, OF CEDARVILLE, CALIFORNIA.

WORK-BENCH STOP.

982,716. Specification of Letters Patent. Patented Jan. 24, 1911.

Application filed July 29, 1910. Serial No. 574,553.

*To all whom it may concern:*

Be it known that I, OSWALD S. GOOCH, a citizen of the United States, residing at Cedarville, in the county of Modoc and State of California, have invented a new and useful Work-Bench Stop; and I do hereby declare the following to be a full, clear, and exact description of the invention, such as will enable others skilled in the art to which it appertains to make and use the same.

The invention relates to a stop for work benches and has for its object to provide an improved device of this character adapted to be applied to a work bench, such as is used by carpenters and the like, and is designed to afford a stop against which the pressure of timber is exerted while being dressed.

Another object of the invention is to provide a stop of this character for work benches pivotally mounted below the surface of the bench, and capable of various adjustments.

With these and other objects in view the invention consists in the novel construction and arrangement of parts hereinafter shown and described and particularly pointed out in the appended claims.

In the drawings:—Figure 1 is a perspective view of a portion of the work bench showing my invention applied thereto. Fig. 2 is a longitudinal sectional view through the bench. Fig. 3 is an inverted plan view. Fig. 4 is an enlarged perspective view of the adjusting means.

Referring to the drawings, 1 designates a work bench having a side portion 2. Secured to the under side of the bench 1 is a plate 3, which is rigidly secured thereto, and to which an arm 4 is pivotally connected, as at 5. The arm 4 is provided with a bend, as at 6 to form a raised seat for the purpose of projecting the stop 7 through the opening 8, and slightly above the upper face of the bench 1. The stop 7 is formed of sheet metal and is bent longitudinally to form a base portion 7ª and interposed side walls 7ᵇ. The front ends of the walls are provided with oppositely extending stops 7ᶜ which are arranged at substantially right angles to the sides and in a substantially horizontal plane, and are each provided with teeth 7ᵈ, along their front edges. The stop is rigidly secured to the seat 6 of the arm 4 by rivets or other suitable fastening means.

Projecting downwardly from the under face of the bench 1 is a rigid arcuate rod 9, which is provided with notches 10. The rod 9 passes through an aperture in the arm 4, as at 11. The free end of the arm 4 is provided with a dog or detent 12, which is pivotally mounted thereto, as at 13. Mounted between the outer ends of the dog 12, and the arm 4 is a coil spring 14, which is held against displacement by a guide member 15. When the spring is compressed, the dog or detent 12 becomes disengaged from the notches 10, and the arm 4 can then be raised or lowered, as desired.

When a thick piece of timber is being dressed, of course the dog will be raised above the surface of the bench 1 to the utmost limit, but of course when a thin piece of timber is being dressed or planed, the stop 7 is lowered by compressing the spring, which permits the arm to move freely, and when the desired adjustment has been secured, the arm 4 is locked in that position, when the dog or detent is released.

The side 2 of the bench is provided with an opening or cutaway portion 16, which affords ready access to the adjusting mechanism.

What I claim is:—

1. In combination with a work bench having an opening in the top, an arm, a stop rigidly connected to said arm and adapted to be projected through said opening, an arcuate guide rod connected to the underside of the top and projecting downwardly and extending through said arm, and a dog or detent carried by said arm and coöperating with the rod for locking the said arm in its adjusted position.

2. In combination with a working bench, having an opening in the top, of an arm pivotally mounted on the underside of the top, said arm being bent to form a raised seat adapted to be projected into the said opening of the top, a stop rigidly connected to the raised seat of the arm and adapted to be projected above the top, an arcuate guide rod connected to the underside of the top and projecting downwardly therefrom, and extending through the free end of the arm, and a dog carried by said arm and coöperating with the rod for locking the stop in its adjusted position.

3. In combination with a working bench, having an opening in the top, of an arm pivotally mounted on the underside of the top, said arm being bent to form a raised seat, a stop rigidly connected to the raised seat of said arm and adapted to be projected above the top, an arcuate guide rod connected to the underside of the top and projecting downwardly therefrom, and extending through the free end of the arm, said rod being provided with a plurality of notches, and a dog carried by said arm and adapted to coact with the notches of the rod for locking the stop in its adjusted position.

4. In combination with a working bench having an opening in the top, of an arm pivotally mounted on the underside of the top, said arm being bent to form a raised seat adapted to be projected into the said opening of the top, a stop rigidly connected to the raised seat of the arm and adaptd to be projected above the top, said stop being formed of sheet metal and bent longitudinally to form a base portion and opposed side walls, the forward ends of the walls being bent to form oppositely extending stops which are arranged at substantially right-angles to the sides and in a substantially horizontal plane, the front edges of the said stops being provided with a plurality of teeth, an arcuate guide rod connected to the underside of the top and projecting downwardly therefrom, and extending through the free end of the arm, and a dog carried by said arm and coöperating with the rod for locking the stop in its adjusted position.

In testimony whereof I have signed my name to this specification in the presence of two subscribing witnesses.

OSWALD S. GOOCH.

Witnesses:
H. M. LESTER,
J. H. HANSEN.